United States Patent
Gray

(10) Patent No.: US 12,504,198 B2
(45) Date of Patent: Dec. 23, 2025

(54) AUTOMATED SEALANT APPLICATION TO ASSEMBLED HVAC DUCT COMPONENTS AND BLANKS FOR FORMING ASSEMBLED HVAC DUCT COMPONENTS

(71) Applicant: William R. Gray, Raleigh, NC (US)

(72) Inventor: William R. Gray, Raleigh, NC (US)

(73) Assignee: William R. Gray, Raleigh, NC (US)

( * ) Notice: Subject to any disclaimer, the term of this patent is extended or adjusted under 35 U.S.C. 154(b) by 0 days.

(21) Appl. No.: 17/852,023

(22) Filed: Jun. 28, 2022

(65) Prior Publication Data

US 2022/0333813 A1    Oct. 20, 2022

Related U.S. Application Data

(62) Division of application No. 15/812,281, filed on Nov. 14, 2017, now Pat. No. 11,408,635.

(51) Int. Cl.
| | |
|---|---|
| F24F 13/02 | (2006.01) |
| B05B 3/00 | (2006.01) |
| B05D 1/02 | (2006.01) |
| B05D 7/14 | (2006.01) |

(52) U.S. Cl.
CPC ............ *F24F 13/0245* (2013.01); *B05B 3/00* (2013.01); *F24F 13/0209* (2013.01); *B05D 1/02* (2013.01); *B05D 7/146* (2013.01); *B05D 2202/00* (2013.01); *Y10S 901/43* (2013.01); *Y10S 901/47* (2013.01)

(58) Field of Classification Search
None
See application file for complete search history.

(56) References Cited

U.S. PATENT DOCUMENTS

| | | | |
|---|---|---|---|
| 4,927,487 A | 5/1990 | Gelinas et al. | |
| 5,415,693 A | 5/1995 | Yoneda et al. | |
| 5,429,682 A | 7/1995 | Harlow, Jr. et al. | |
| 5,439,313 A | 8/1995 | Blaha et al. | |
| 6,034,594 A | 3/2000 | Gray | |
| 6,244,633 B1* | 6/2001 | Warren ................. | F16L 37/008 285/141.1 |
| 6,722,178 B1* | 4/2004 | Ito ........................... | B25J 9/102 72/422 |
| 7,677,196 B2 | 3/2010 | Herre | |
| 8,646,404 B2 | 2/2014 | Hendricks, Sr. | |
| 2003/0131791 A1 | 7/2003 | Schultz et al. | |
| 2007/0000442 A1* | 1/2007 | Schucker ............... | B25J 19/023 118/713 |
| 2008/0303276 A1 | 12/2008 | Bloom et al. | |
| 2009/0246411 A1* | 10/2009 | Fenton ................. | F24F 13/0245 427/595 |
| 2010/0075058 A1 | 3/2010 | Rademacher et al. | |
| 2010/0194105 A1* | 8/2010 | Paquet ...................... | E21F 1/06 285/330 |
| 2011/0266791 A1 | 11/2011 | Fetko | |
| 2013/0284088 A1* | 10/2013 | Takayama ................. | B05C 5/02 901/43 |
| 2014/0202225 A1* | 7/2014 | Runyan .................. | B21D 5/015 72/372 |
| 2014/0329013 A1* | 11/2014 | Rouaud .................... | B05D 1/36 118/695 |
| 2017/0060115 A1* | 3/2017 | Battles ................. | G05B 19/402 |
| 2017/0106538 A1 | 4/2017 | Tomuta et al. | |
| 2017/0235297 A1 | 8/2017 | Salour et al. | |

OTHER PUBLICATIONS

Aircraft air conditioning systems (Jun. 2017). Retrieved Feb. 11, 2021, from https://www.aircraftsystemstech.com/2017/05/aircraft-air-conditioning-systems.html (Year: 2017).
Napert, G. (Jul. 1, 1998). "Air conditioning on a 172?" Retrieved Feb. 12, 2021, from https://www.aviationpros.com/home/article/103 (Year: 1998).
"Snap-Rite Manufacturing, Inc." Catalog, 2010.
Southern Metal Fabricators. "How Heavy Ductwork is Custom Fabricated". (Jun. 23, 2016). https://www.southernmetalfab.com/blog/how-heavy-ductwork-is-custom-fabricated/ [archived version retrieved from https://web.archive.org/] (Year: 2016).

* cited by examiner

*Primary Examiner* — Jose I Hernandez-Kenney
(74) *Attorney, Agent, or Firm* — Jodi A. Reynolds, Esq.; Brian B. Shaw, Esq.; Harter Secrest & Emery LLP

(57) ABSTRACT

A robotic system is provided for repeatedly and reproducibly applying a sealant to a seam in an assembled HVAC duct component. The applied sealant has a predetermined location on the assembled HVAC duct component to seal the seam. An assembled HVAC duct component is thus provided having a robot applied sealant on at least one seam in the assembled HVAC duct component, wherein the applied sealant has at least one of a predetermined location, thickness or coverage. The robotically applied sealant can be applied to a blank for forming the assembled HVAC duct component, wherein the sealant is located at locations forming a seam in the assembled HVAC duct component.

17 Claims, 4 Drawing Sheets

AUTOMATED SEALANT APPLICATION TO ASSEMBLED HVAC DUCT COMPONENTS AND BLANKS FOR FORMING ASSEMBLED HVAC DUCT COMPONENTS

BACKGROUND OF THE INVENTION

Field of the Invention

The present disclosure relates to HVAC duct components and particularly to assembled HVAC duct components having a seam and more particularly to assembled HVAC duct components having a robot applied sealant extending along at least a portion of the seam as well as blanks for forming the assembled HVAC duct component having a robot applied sealant extending along seam forming locations.

Description of Related Art

The shipping efficiency of HVAC duct components is improved by being able to nest or stack the unassembled components. However, shipping unassembled HVAC components requires downstream assembly and sealing of the components. This downstream assembly and sealing can lead to inefficiencies such as improper assembly and sealing. Improper sealing leads to leakage through seams, which is a direct energy cost.

While assembled HVAC duct components can reduce the inefficiencies associated with improper assembly, the issues of sealing the assembled HVAC duct component still creates issues. Typically, such assembled HVAC duct components are sealed at the installation site by hand. That is, an operator applies a sealant by hand to the seams of the assembled HVAC duct component. The operator applied sealant is often of inconsistent application location as well as coating sufficiency and thus does not effectively and efficiently seal the seams for a material percentage of the assembled HVAC duct components. This results in a product that is often met with customer resistance due to appearance and coverage. For those assembled HVAC components that are sealed at the factory, the manual application of the sealant results in inconsistent application, excess material usage and again customer resistance due to appearance and coverage.

A need exists for sealed assembled HVAC duct components, wherein the components have repeatable sealant location and application and coverage.

BRIEF SUMMARY OF THE INVENTION

The present disclosure provides for repeatable and effective sealing of assembled HVAC duct components.

The present disclosure provides a method including releasably retaining an assembled HVAC duct component in a fixture, the assembled HVAC duct component having a seam; and applying, by a robot applicator, a sealant along the seam, the applied sealant having at least one of predetermined coverage area and application thickness or location relative to the seam.

The present disclosure further provides an apparatus for applying a sealant to a seam in an assembled HVAC duct component having a seam or a blank for forming the assembled HVAC duct component, wherein the apparatus includes a fixture configured to releasably retain the assembled HVAC duct component in a predetermined location/orientation; a robot applicator having a movable arm; a sealant delivery system having a supply of sealant and an applicator operably connected to the moveable arm; and a controller connected to the robot applicator and the sealant supply, the controller configured to apply a predetermined amount of sealant to a predetermined area of the assembled HVAC duct component or the blank.

The present disclosure also provides an assembled HVAC duct component having a sheet metal HVAC duct component having an assembled state in which the component is shipped and installed, the HVAC duct component in the assembled state defining a seam between confronting surfaces; and a sealant being applied by robot control and overlying the seam and bonded to a predetermined portion of an adjacent surface of the HVAC duct component, the sealant having a predetermined thickness and coverage area.

Thus if sealant application is controlled to just the amount necessary, for those sealants that require curing, the curing process is increased as less sealant needs to be cured. This increases efficiency of production as well as efficiency of sealant usage.

BRIEF DESCRIPTION OF THE SEVERAL VIEWS OF THE DRAWING(S)

DETAILED DESCRIPTION OF THE INVENTION

Figure 1:
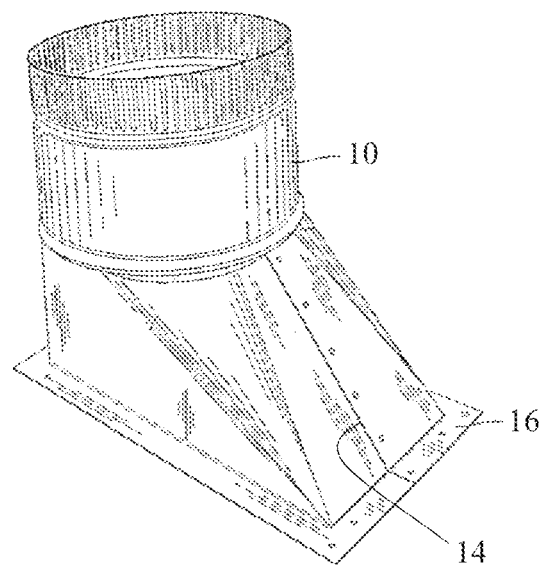
FIG. 1 is a perspective view of an assembled HVAC duct component.
Figure 2:
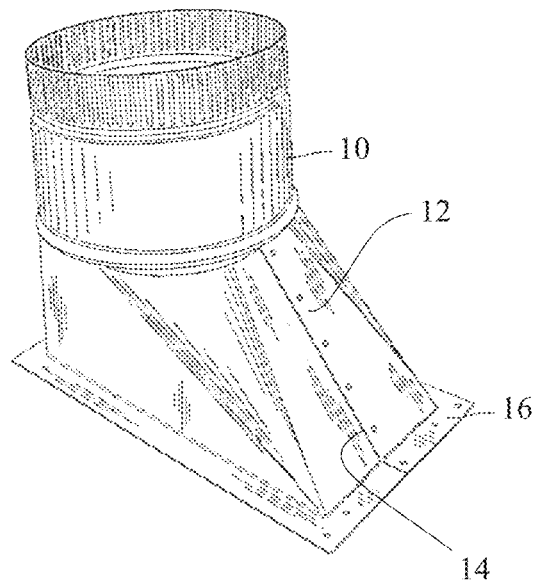
FIG. 2 is a perspective view of the assembled HVAC duct component of FIG. 1, having a robotically applied sealant.
Figure 3:
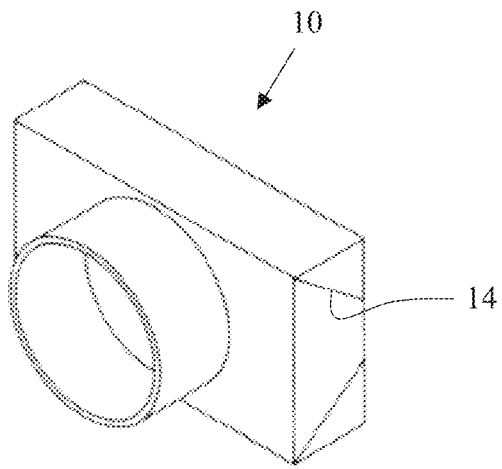
FIG. 3 is a perspective view of another assembled HVAC duct component.
Figure 4:
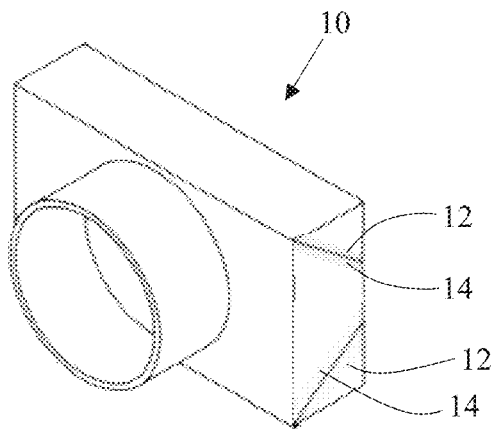
FIG. 4 is a perspective view of the assembled HVAC duct component of FIG. 3, having a robotically applied sealant.
Figure 5:
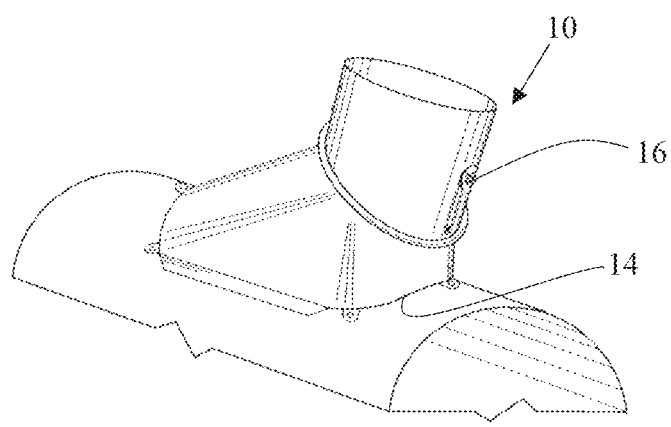
FIG. 5 is a perspective view of an alternative assembled HVAC duct component.
Figure 6:
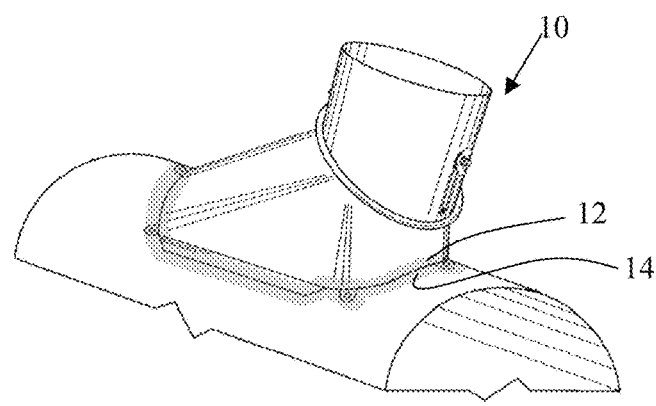
FIG. 6 is a perspective view of the assembled HVAC duct component of FIG. 5, having a robotically applied sealant.
Figure 7:
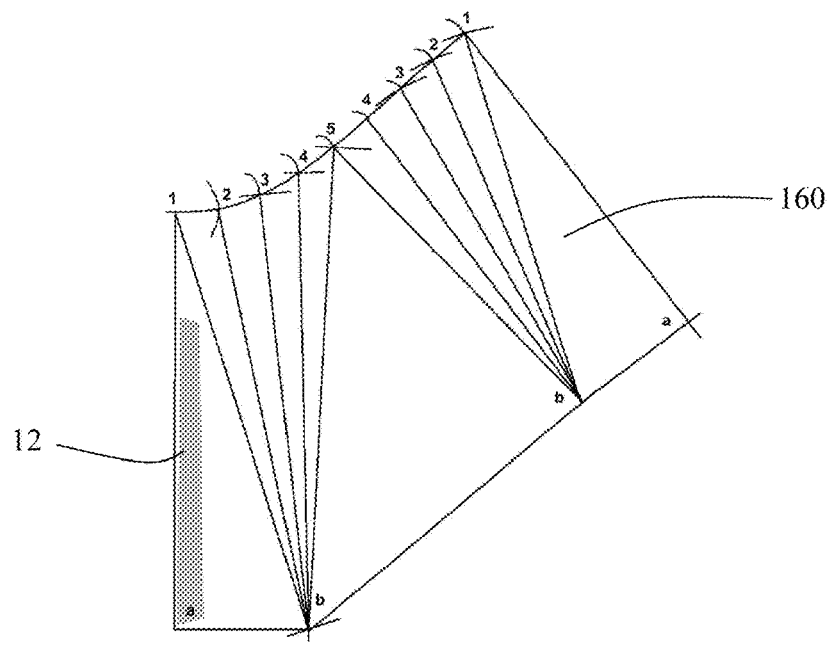
FIG. 7 is a sheet metal blank for forming an assembled HVAC duct component, wherein the blank includes robotically applied sealant.

As seen in the Figures, a system for automated sealant application to assembled HVAC duct components 10, according to one embodiment of the present disclosure is provided. The automated sealant application system includes a fixture 30, a sealant delivery system 40 with at least one applicator 50, and a robot for applying a sealant 12 to the assembled HVAC duct component 10 or a blank 160.

The term "assembled HVAC duct component" 10 includes any HVAC duct component having an assembled state in which the component is shipped and installed, wherein the component includes a seam 14 between portions of a continuous piece of metal or separate pieces of metal. That is, the assembled HVAC component 10 has an assembled state defining a seam between portions of a continuous piece of material or separate pieces of material, wherein the component is shipped and installed in the assembled configuration. In one configuration, the assembled HVAC duct component 10 or the blank 160 includes at least one fiducial 16. The fiducial 16 can be a mark on or in the sheet metal such as a dimple or deformation of the assembled HVAC duct component 10. The fiducial 16 is configured to provide a known location with respect to the seams 14 to be sealed or a predetermined portion or point of the assembled HVAC duct component 10 or the blank 160.

The term "blank" 160 includes the piece or pieces of stock that are formed, and joined as necessary to form the assembled HVAC duct component 10. In one configuration, the blank 160 is a piece of sheet metal.

The term "seam" 14 includes confronting, abutting, overlapping or adjacent surfaces of the assembled HVAC duct component 10, wherein a gap or separation between the surfaces is to be closed or sealed for intended operating parameters of the assembled HVAC duct component. The seam 14 can include the confronting surfaces, such as in a lap seam, as well as additional or supplemental fasteners maintaining the confronting surfaces in the intended configuration. As these additional or supplemental fasteners can contribute to leakage of the assembled HVAC duct component 10, the present system can apply sealant 12 to the interface of the additional or supplemental fasteners and the sheet metal. For purposes of description, the term seam 14 encompasses any associated mechanical fasteners.

The term "HVAC duct component" 10 includes an HVAC transition box as well as fittings, collars, pipes, channels, cleats, dampers, takeoffs, register boxes, boxes, boots, stacks, register boots, stack heads, reducers, elbows, caps, plenums, angles, flue pipes, wyes, dampers, boxes, outlets, tees, pipes, spin fittings, boots which include a seam to be sealed.

The term "applicator" 50 includes sprayers, spray nozzles, spreaders, wipers, injectors, nozzles, brushes, atomizers, ribbon formers, dispensers, sealers, rollers and beaders. The applicator 50 can further include, but is not limited to scrapers, rollers, wipers blades, air knives for adjusting or modifying applied sealant. The specific type of applicator 50 and configuration is at least partly determined by the assembled HVAC duct component 10 to be sealed as well as the sealant 12 to be used and desired level of coverage or application.

The sealant 12 can be any of variety of materials including but not limited to water based sealant, solvent based sealant as well as hot melt. The sealant 12 can be curable by activation or time, as well as non curing materials known in the art. The sealant 12 can be liquid, paste, viscous, flowable, thixotropic, rheopectic, dilatant or mastic. The sealant 12 can be solid or cellular, either closed cell or open cell. In select configurations, the sealant 12 meets UL standards for sealant as well as any state and local regulations or standards. The sealant 12 can be any material that reduces air leakage across or through the seam 14.

The fixture 30 retains the assembled HVAC duct component 10 during application of the sealant 12. The fixture 30 provides a repeatable and accurate retention of the assembled HVAC duct component 10, and particularly relative to the robot 100. The fixture 30 can include clamping mechanism for releasably engaging the assembled HVAC duct component 10 as well as retaining surfaces configured to engage the assembled HVAC duct component and operably retain the assembled HVAC duct component 10 during the sealant application process. Retention of the assembled HVAC duct component 10 in the fixture 30 can be accomplished by operator or automatically, such as by a pick and place system known in the art. In one configuration, the fixture 30 is fixed. Alternatively, the fixture 30 can be moveable relative to the robot 100 (and applicator 50). Thus, the fixture 30 can include an actuator or manipulator for disposing the assembled HVAC duct component 10 in a particular location or through a given motion path.

The sealant delivery system 40 includes a sealant supply 60, a sealant motive system 70 and at least one applicator 50 for delivering (depositing) sealant 12 to the assembled HVAC duct component 10 or blank 160. As set forth above, the applicator 50 can be any of a variety of configurations. For purposes of illustration, the applicator 50 as a spray gun is set forth in detail, though it is understood the disclosure is not limited to the particular type of applicator. Although the spray gun can be unidirectional, it is understood the spray gun may be moveable, such as by connection to the robot. The sealant motive system 70 includes controls for adjusting the amount of delivered sealant, the rate of sealant application, as well as the coverage area of the sealant application. That is, the flow rate of the sealant, pressure or velocity of sealant, pattern of the sealant application can all be controlled by the sealant delivery system 40. It is recognized that the robot 100 applicator 50 can control or provide a plurality of parameters such as fan width, and application rate (or application thickness) and spray volume by controlling the speed of relative motion between applicator 50 and assembled HVAC duct component 10. Thus, the sealant can be applied as a spray, a ribbon, a tape, a bead or a foam that is deposited in the predetermined location on the HVAC duct component or the blank.

Figure 8:
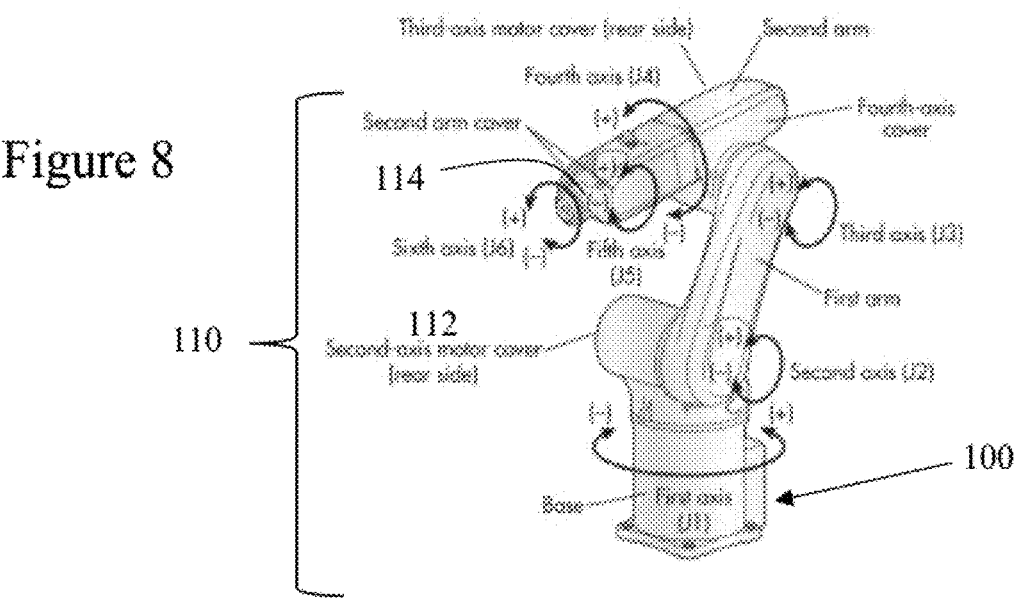
FIG. 8 is a perspective view of a robot.
Figure 9:
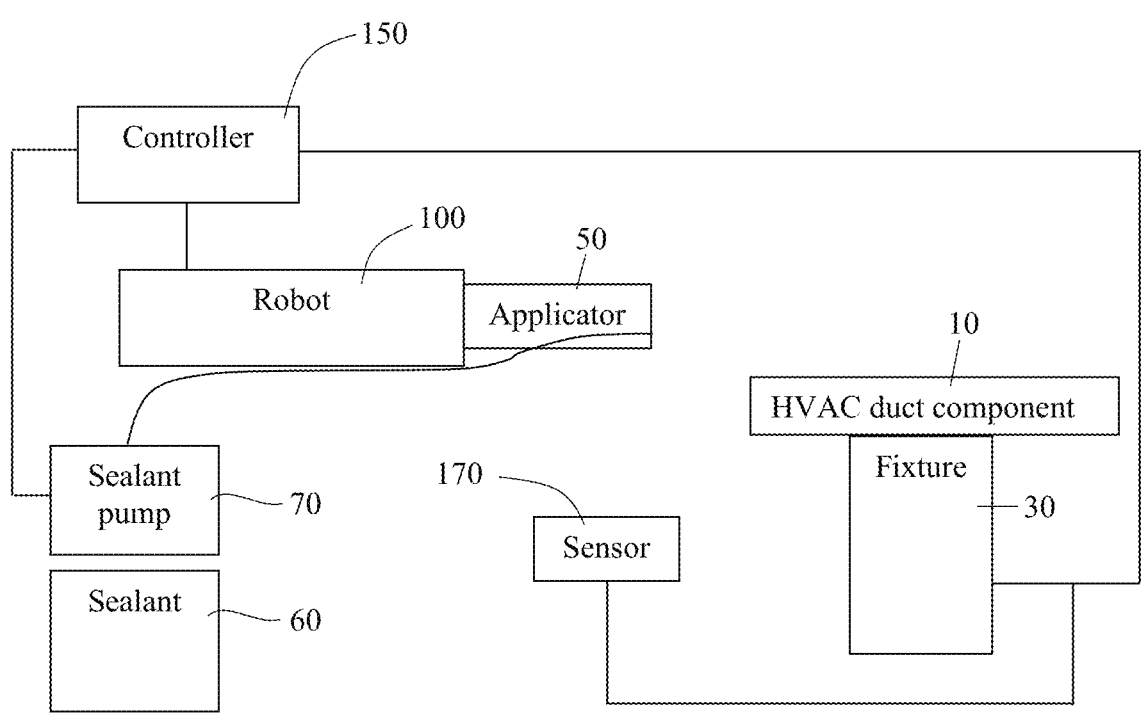
FIG. 9 is a schematic representation of a configuration of the present system.

As shown in FIG. 8, the robot 100 can be multi-axis machine. Representative examples of the robot include a 4-, 5-, and 6-axis robot. The robot 100 can be a commercially available industrial robot, such as from Kuka. The robot 100 includes an operable working arm 110 driven by at least one actuator 112. The working arm 110 can include a gripper or mount 114 that allows the robot to selectively engage the assembled HVAC duct component 10, the fixture retaining the assembled HVAC duct component, the blank 160 or the applicator 50. Typically, the working arm 110 defines a working volume or sector within which the robot 100 can functionally locate the applicator 50. Depending on the particular assembled HVAC duct component 10 and the seam geometry, the fixture 30 may need to change an orientation of the assembled HVAC duct component 10 or blank 160 or blank 160 during the application process to locate the entire seam geometry within the working volume of the robot 100.

Depending on the creation of the relative movement between the assembled HVAC duct component 10 or blank 160 and the applicator 50, the working arm 110 can be rotatable, and facilitate a rotation of the applicator by the robot during the application operation. It is contemplated that positioning of the fixture 30 (and hence assembled HVAC duct component 10 or blank 160) relative to the applicator 50 can be finely controlled by the robot 100. In select configurations, the robot 100 is the only component of the system responsible for relative movement between the assembled HVAC duct component 10 or blank 160 and the applicator 50 during application of the sealant 12. However, it is contemplated there may be at least a first and a second orientation of the fixture 30 (hence assembled HVAC duct component 10 or blank 160), wherein the robot 100 performs a first portion of the sealant application in the first orientation and a second portion of the sealant application in the second orientation. For example, the first orientation may expose certain portions of the seam 14 to the working volume and the second configuration may locate further portions of the seam within the working volume. It is further contemplated that the sealant 12 can be applied to either the ambient exposed side of the seam 14 or the conducted fluid side of the seam.

The robot 100 can further include an X-Y-Z table in addition to or in place of the robotic arm 110. It is further understood the robot 100 can include an X-table or a Y-table or a Z-table as well as any combination thereof. Thus, the robot 100 can include a single motion applicator 50.

The robot 100 can include or be operably connected to a controller 150. For purposes of description, the controller 150 is set forth as a generally independent component, however it is understood the controller can be integral to the robot 100. Thus, the robot 100 may execute a plurality of works by having an installed motion program or by operable connection to the motion control program. The motion program may contain information that defines the motion of the robot 100. The controller 150 can also include an abnormality determination unit that may perform an abnormality determination in accordance with the scanner (sensing device) when detecting the position of the assembled HVAC duct component 10 or blank 160 within the working volume.

The controller 150 thus operates at least one of the robot 100 and the at least one applicator 50 when applying sealant to the assembled HVAC duct component 10 or the blank 160. The controller 150 may also include a memory unit (which can include a library or database of assembled HVAC duct components and associated application patterns and blanks) and one or more central processing units, and be used to calculate application parameters for each individual assembled HVAC duct component, for example, based upon measurements, barcode readings, and the like. In particular, the position of the assembled HVAC duct component 10 or blank 160 relative to the applicator 50, application area, deposition rate (or in the spray configuration fan width, atomizing air, rotation speed, and spray volume) may be calculated by the controller 150 on a per assembled HVAC duct component 10 or blank 160 basis. The controller 150 can also include an operator interface that permits an establishment of settings or manual operation of the applicator 50, or sealant delivery system 40.

In one configuration, the controller 150 is operably connected to least one sensing device 170 such as an optical scanner or reader. The reader can read a code or label, or predetermined or pre-associated indicia corresponding to the given assembled HVAC duct component 10 or blank 160. Alternatively, the reader can be an optical reader for scanning the assembled HVAC duct component 10 or blank 160 and linking the scanned image to a library including a library of images, so as to automatically identify the assembled HVAC duct component 10 or blank 160.

The at least one sensing device 170 can include a light array assembly for measuring the dimensions of the assembled HVAC duct component 10 or blank 160 prior to applying the sealant 12 to the assembled HVAC duct component 10 or blank 160. The light array assembly can include at least one light emitter and at least one light receiver. The light array assembly can be operably located outside the working volume of the working arm. In one configuration, the light array assembly includes a vertical light emitter and a vertical light receiver, and a horizontal light emitter and a horizontal light receiver. The light array assembly can be employed to measure at least one of seam location, a fiducial marker or surface (outer or inner) of the assembled HVAC duct component 10 or blank 160. The measurement data from the light array assembly is then sent to the controller 150, which uses the measurement data in calculating spray parameters and controlling the at least one of the sealant delivery system 40 and the robot 100.

In a further configuration, the at least one sensing device 170 is a camera. The camera can be used to generate an image of the assembled HVAC duct component 10 or blank 160, which is then provided to the controller 150 for calculating or determining application parameters, modifying application parameters or identifying appropriate instructions from the library. The camera can be located to provide a horizontal image, a vertical image or a perspective image of the assembled HVAC duct component 10 or blank 160, as desired. As with the measurements obtained by the light array assembly, the image generated by the camera can be used by the controller 150 in operating at least one of the sealant delivery system 40 and the robot 100.

It is further contemplated the sensing device 170 can sense the fiducial 16 and thus provide the controller 150 with the necessary reference point for initiating the sealant application process.

It is also contemplated the working arm 110 of the robot 100 can carry the sensing device 170, such as the camera and thus provide any of a variety of images to the controller 150 or the library.

The library includes a seam pattern for the respective assembled HVAC duct component 10 or blank 160, along with dimensions of the assembled HVAC duct component 10 or blank 160 and applicable coverage patterns, application rates. The system thus identifies the coverage pattern associated with the relevant assembled HVAC duct component 10 or blank 160.

Because the assembled HVAC duct component 10 may be used in different installations or different components have different intended operating parameters, the operating pressures which a given component and hence seam must withstand can vary. Thus, different assembled HVAC duct components may have different seam requirements as well as the same component have different seam requirements.

In addition, the library may include any necessary accommodations or changes in an application pattern or rate to address deflection or deformation of the assembled HVAC duct component 10. That is, some assembled HVAC duct component may predictably or repeatedly deflect during retention in the fixture or the sealant application process. Thus, the controller 150 may alter at least one parameter of the sealant application to accommodate the temporary deformation of the assembled HVAC duct component 10.

In one configuration, the sealant 12 is applied to the assembled HVAC duct component 10 or blank 160 in a spray booth. The spray booth can have a variety of configurations, such as open type spray booths; non-pressurized booths; pressurized booths; crossflow booths; semi-downdraft booths; side-downdraft booths and downdraft booths.

The spray booth can include a collection pan beneath the assembled HVAC duct component 10 or blank 160 in the booth. Depending on the specific sealant 12, the collection pan can include a drain port or recycle line to the sealant supply. An overspray from the fluid delivery system collects in the pan, passes through the drain port for proper disposal or through the recycling line for recycling in the sealant dispensing system. The spray booth can include a plurality of fixed baffles disposed upstream of the exhaust fan. The overspray from the sealant delivery system 40 is drawn by the exhaust fan, and collects on the baffles as it flows past the baffles. The condensed overspray then drips into a removable clean out tray or the collection pan.

The spray booth can also include a filter system. The filter system includes a filter for capturing particulate matter in the passing air flow. Typically, the filter is functionally located up stream of the exhaust fan. The filter system is configured to remove any residual overspray from the sealant delivery system 40. It is understood the filter system can include a bank of removable filters. The removable filters may be formed from a nonwoven or fibrous filter media as known in the art.

The present system provides a method for applying a sealant 12 to an exposed seam of an assembled HVAC duct component 10 or blank 160. The method includes releasably retaining the assembled HVAC duct component 10 or blank 160 in the fixture 30. The applicator 50 is automatically moved relative to the assembled HVAC duct component 10 or blank 160 in the fixture 30, by movement of the working arm 110, the fixture 30 or a combination of both. The controller 150 controls the relative motion of the assembled HVAC duct component 10 or blank 160 and the sealant delivery system 40 (including the applicator 50) to provide the predetermined coverage area, sealant application thickness and location of the coverage area on the assembled HVAC duct component 10 or blank 160.

Thus, there is a signature of the sealant 12 on the assembled HVAC duct component 10 or blank 160. The signature indicates whether the sealant 12 was applied by an operator (by hand) or with the present system. That is, with the present system the variance of sealant location, coverage area and application thickness is typically within 10% and in certain configurations within 5% within a given sealed assembled HVAC duct component 10 or blank 160. In contrast, the hand applied sealant will vary by 25% or more in sealant location, coverage area and application thickness. Thus, visual inspection can detect the signature of the sealant and hence the process of application.

The signature can be examined between a single robot applied sealant on the assembled HVAC duct component 10 or blank 160 or blank and a single hand applied sealant on the assembled HVAC duct component or blank. In addition, the signature can be detected by comparing a plurality of sealed HVAC duct components 10 or blanks 160. For example, in comparing a plurality of robot sealed assembled HVAC duct components 10 or blanks 160, the variance of the sealant location, coverage area and application thickness between the components is within 10%, and often 5% or less. In certain signatures of assembled HVAC duct components 10 or blanks 160 having robot applied sealant, the variance is 3% or less, depending on the sealant and the configuration of the assembled HVAC duct component or blank. In contrast, comparing a plurality of assembled HVAC duct components or blanks with hand applied sealant, the variance in at least one of the sealant location, coverage area and application thickness between the components can be at least 20%.

Thus, the present system provides precision deposition (application) of sealant 12 to a factory made assembled HVAC duct component 10 or blank 160 by robotic control of the applicator 50.

As set forth above, the present disclosure contemplates the robotic application of the sealant 12 as part of the assembly process of the HVAC duct component 10 from the blank 160.

Generally, the HVAC duct component 10 is formed from the blank 160 such as a planar sheet of sheet metal. On the factory floor, the sheet metal can be initially in a roll form or flat form. The initial sheet metal is cut to a length providing the blank 160 for processing, wherein a single or a plurality of HVAC duct components 10 are to be generated from the blank. The blank 160 is then typically cut to a predetermined configuration, formed (such as bending or forming) to a final shape or an intermediate shape which then in combination with fasteners assumes the assembled configuration.

The sealant 12 can be robotically applied to the sheet metal or blank 160 at any step of the manufacturing process. The robot 100 can apply the sealant 12 to the blank 160 or the partially formed blank in a location that will be part of a seam 14 in the assembled HVAC duct component 10. Thus, in some methods, the sealant 12 is applied to the formed seam 14 in the assembled HVAC duct component 10 and in other methods the sealant is applied by the robot 100 to the blank 160 in a location that will become the seam 14 upon forming of the blank into the assembled HVAC duct component 10. Thus, there may be cutting, trimming, bending or forming of the blank 160 having the applied sealant 12. In addition, it is contemplated the sealant 12 can be applied robotically to both the first and second side [major surface] of the blank 160, such that the sealant is located at the seam locations in the assembled HVAC duct component.

The present robotic application of sealant 12 provides for a more energy efficient HVAC duct component 10, as leakage is reduced. In addition, material is conserved as over application and excess application are reduced. Thus, inefficiencies in both manufacture and use of the HVAC duct component 10 are reduced.

While certain representative embodiments and details have been shown for purposes of illustrating the invention, it will be apparent to those skilled in the art that various changes may be made without departing from the scope of the invention, which is further described in the following appended claims. The detailed description and appended drawings describe and illustrate various exemplary embodiments of the system. The description and drawings serve to enable one skilled in the art to make and use the system, and are not intended to limit the scope of the system in any manner. In respect of the methods disclosed, the steps presented are exemplary in nature, and thus, the order of the steps is not necessary or critical.

The invention claimed is:

1. A method of forming at least a first assembled heating, ventilation, and air conditioning duct component, the method comprising:
   (a) cutting a sheet metal blank to a predetermined configuration to form a cut sheet metal blank, the cut sheet metal blank having a first major surface and a second major surface;
   (b) retaining the cut sheet metal blank in a fixture configured to releasably retain and to present the first major surface or the second major surface to an applicator;
   (c) presenting to the applicator by the fixture, the first major surface in a first orientation of the cut sheet metal blank;
   (d) applying, with a robot, a sealant from the applicator to a predetermined portion of the first major surface in the first orientation of the cut sheet metal blank in the fixture relative to the applicator;
   (e) presenting to the applicator by the fixture, the second major surface in a different second orientation of the cut sheet metal blank;
   (f) applying, with the robot, the sealant from the applicator to a predetermined portion of the second major surface in the different second orientation of the cut sheet metal blank in of the fixture relative to the applicator; and
   (g) forming the cut sheet metal blank having the applied sealant on the first major surface and the second major surface, to produce the first assembled heating, ventilation, and air conditioning duct component.

2. The method of claim 1, wherein the first assembled heating, ventilation, and air conditioning duct component includes a fastener.

3. The method of claim 1, further comprising applying, with the robot, at least one of (i) a predetermined amount of the sealant and (ii) a predetermined coverage area of the sealant to at least one of the predetermined portion of the first major surface and the predetermined portion of the second major surface.

4. The method of claim 1, wherein forming the cut sheet metal blank having the applied sealant on the first major surface and the second major surface, to produce the first assembled heating, ventilation, and air conditioning duct component comprises contacting a portion of the sealant on the first major surface with a portion of the sealant on the second major surface.

5. The method of claim 1, wherein forming the cut sheet metal blank having the applied sealant on the first major surface and the second major surface, to produce the first assembled heating, ventilation, and air conditioning duct component includes affixing a mechanical fastener to the first assembled heating, ventilation, and air conditioning duct component.

6. The method of claim 1, wherein applying, with the robot, the sealant from the applicator includes applying with one of an X-Y table, an X-Y-Z table, and a robotic arm.

7. The method of claim 1, wherein forming the cut sheet metal blank having the applied sealant on the first major surface and the second major surface, to produce the first assembled heating, ventilation, and air conditioning duct component includes affixing a fastener to the cut sheet metal blank.

8. The method of claim 1, further comprising:
(h) forming a second assembled heating, ventilation, and air conditioning duct component in accordance with steps (a) through (g) of claim 1, wherein when applying the sealant to the predetermined portions of the first major surfaces and the second major surfaces in accordance with steps (d) and (f), the sealant is applied such that at least one of (i) a coverage area and (ii) an application thickness of the applied sealant on at least one of the first major surface and the second major surface of the first assembled heating, ventilation, and air conditioning duct component is within 10% of (i) the coverage area and (ii) the application thickness of the applied sealant on the at least one of the first major surface and the second major surface of the second assembled heating, ventilation, and air conditioning duct component.

9. The method of claim 1, further comprising, before the step of (d), reading with an optical reader a fiducial corresponding to a location on the sheet metal blank to identify, by a controller, the location on the sheet metal blank.

10. The method of claim 1, wherein retaining the cut sheet metal blank in a fixture configured to releasably retain and to present the first major surface or the second major surface to the applicator includes releasably clamping the cut sheet metal blank.

11. A method of producing at least a first assembled heating, ventilation, and air conditioning duct component, the method comprising:
(a) retaining a sheet metal blank in a fixture configured to releasably retain, the sheet metal blank having a first major surface and a second major surface;

(b) presenting to the applicator by the fixture, the first major surface in a first orientation of the cut sheet metal blank;
(c) applying, with a robot, a sealant from an applicator to a predetermined portion of the first major surface;
(d) presenting to the applicator by the fixture, the second major surface in a different second orientation of the cut sheet metal blank;
(e) applying, with the robot, the sealant from the applicator to a predetermined portion of the second major surface;
(f) forming the cut sheet metal blank having the applied sealant on the first major surface and the second major surface; and
(g) affixing a mechanical fastener to the formed heating, ventilation, and air conditioning duct component to produce the first assembled heating, ventilation, and air conditioning duct component.

12. The method of claim 11, further comprising, before the step of (c), reading with an optical reader a fiducial corresponding to a location on the sheet metal blank to identify, by a controller, the location on the sheet metal blank.

13. The method of claim 11, wherein applying, with the robot, the sealant from the applicator includes applying with one of an X-Y table, an X-Y-Z table, and a robotic arm.

14. The method of claim 11, further comprising:
(f) forming a second assembled heating, ventilation, and air conditioning duct component in accordance with steps (a) through (f) of claim 11, wherein at least one of (i) a coverage area and (ii) an application thickness of the applied sealant on at least one of the first major surface and the second major surface of the first assembled heating, ventilation, and air conditioning duct component is within 10% of (i) the coverage area and (ii) the application thickness of the applied sealant on at the least one of the first major surface and the second major surface of the second assembled heating, ventilation, and air conditioning duct component.

15. A method of producing a first assembled heating, ventilation, and air conditioning duct component, the method comprising:
(a) retaining a sheet metal blank in a fixture configured to releasably retain, in a predetermined orientation, the sheet metal blank having a first major surface and a second major surface;
(b) presenting to the applicator by the fixture, the first major surface in a first orientation of the cut sheet metal blank;
(c) applying, with a robot movable about at least two axes, a sealant from an applicator to a predetermined portion of the first major surface;
(d) presenting to the applicator by the fixture, the second major surface in a different second orientation of the cut sheet metal blank;
(e) applying, with the robot, the sealant from the applicator to a predetermined portion of the second major surface; and
(f) forming the cut sheet metal blank having the applied sealant on the first major surface and the second major surface.

16. The method of claim 15, wherein forming the cut sheet metal blank having the applied sealant on the first major surface and the second major surface produces the first assembled heating, ventilation, and air conditioning duct component.

17. The method of claim 15, wherein applying, with the robot, the sealant from the applicator includes applying with one of an X-Y table, an X-Y-Z table, and a robotic arm.

* * * * *